(12) United States Patent
Kuwata

(10) Patent No.: US 9,363,094 B2
(45) Date of Patent: Jun. 7, 2016

(54) RELAY SYSTEM AND SWITCHING DEVICE

(71) Applicant: Hitachi Metals, Ltd., Minato-ku, Tokyo (JP)

(72) Inventor: Hitoshi Kuwata, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 115 days.

(21) Appl. No.: 14/508,312

(22) Filed: Oct. 7, 2014

(65) Prior Publication Data

US 2015/0180673 A1 Jun. 25, 2015

(30) Foreign Application Priority Data

Dec. 24, 2013 (JP) ................................ 2013-266078

(51) Int. Cl.
*H04L 12/18* (2006.01)
*H04L 12/759* (2013.01)
*H04L 12/761* (2013.01)
*H04L 12/741* (2013.01)
*H04L 29/12* (2006.01)

(52) U.S. Cl.
CPC ............ *H04L 12/185* (2013.01); *H04L 45/028* (2013.01); *H04L 45/16* (2013.01); *H04L 45/74* (2013.01); *H04L 61/103* (2013.01)

(58) Field of Classification Search
CPC ........ H04L 45/16; H04L 45/028; H04L 45/74; H04L 61/103; H04L 12/185
See application file for complete search history.

(56) References Cited

U.S. PATENT DOCUMENTS

| 6,836,481 B1 | 12/2004 | Hotta | |
| 2010/0316050 A1* | 12/2010 | Baykal | H04L 12/185 370/390 |

FOREIGN PATENT DOCUMENTS

| JP | 2001-230774 A | 8/2001 |
| JP | 2004-253975 A | 9/2004 |

\* cited by examiner

*Primary Examiner* — Jianye Wu
(74) *Attorney, Agent, or Firm* — Crowell & Moring LLP

(57) ABSTRACT

A first L2SW acquires a correspondence relation between a multicast group and a representative IP address retained in a snooping table of a second L2SW through a control plane, and registers the correspondence relation to a snooping table of the first L2SW. When the first L2SW receives a multicast packet whose destination is a multicast group, the first L2SW extracts a corresponding representative IP address of the other L2SW based on the snooping table of the first L2SW, and converts the multicast packet into a unicast packet whose destination is the extracted representative IP address. When the destination representative IP address contained in the unicast packet is its own representative IP address, the second L2SW converts the unicast packet into multicast packets.

10 Claims, 14 Drawing Sheets

FIG. 14

SNOOPING TABLE OF L2SW 12a          16a

| MC Gr. | REPRESENTATIVE IP ADDRESS | PORT ID |
|---|---|---|
| GA | IPAb | {P[n]} |
|  | IPAc | {P[n]} |
|  | (IPAa) | {P[1]} |
| ... | ... | ... |

SNOOPING INFORMATION OF L2SW 12a

SNOOPING TABLE OF L2SW 12b          16b

| MC Gr. | REPRESENTATIVE IP ADDRESS | PORT ID |
|---|---|---|
| GA | IPAa | {P[n]} |
|  | IPAc | {P[n]} |
|  | (IPAb) | {P[n-1]} |
| ... | ... | ... |

SNOOPING INFORMATION OF L2SW 12b

SNOOPING TABLE OF L2SW 12c          16c

| MC Gr. | REPRESENTATIVE IP ADDRESS | PORT ID |
|---|---|---|
| GA | IPAa | {P[n]} |
|  | IPAb | {P[n]} |
|  | (IPAc) | {P[2]} |
| ... | ... | ... |

SNOOPING INFORMATION OF L2SW 12c

RELAY SYSTEM AND SWITCHING DEVICE

CROSS-REFERENCE TO RELATED APPLICATION

The present application claims priority from Japanese Patent Application No. 2013-266078 filed on Dec. 24, 2013, the content of which is hereby incorporated by reference into this application.

TECHNICAL FIELD OF THE INVENTION

The present invention relates to a relay system and a switching device, for example, a relay system and a switching device which relay a multicast packet.

BACKGROUND OF THE INVENTION

Japanese Patent Application Laid-Open Publication No. 2001-230774 (Patent Document 1) and Japanese Patent Application Laid-Open Publication No. 2004-253975 (Patent Document 2) disclose a method for achieving the multicast communication using unicast packets. Concretely, a packet conversion device on a transmission side converts a multicast packet from a server into a unicast packet and then transmits it to a packet conversion device on a reception side. The packet conversion device on a reception side converts the unicast packet into a multicast packet and then transmits it to a client.

Here, the packet conversion device of the Patent Document 1 appropriately rewrites destination/source IP addresses of a packet and a UDP port number at the time of conversion between the unicast packet and the multicast packet. In order to perform this rewriting, each packet conversion device is configured to retain a variety of information (IP address and UDP port number) before and after the conversion through mutual communications together with predetermined identifiers. Concretely, when a request from a client is received, the packet conversion device on a reception side starts communication to the packet conversion device on a transmission side on the assumption that the packet conversion device on a reception side knows the IP address of the packet conversion device on a transmission side in advance, and each packet conversion device determines the above-described retained information during this communication.

On the other hand, the packet conversion device on a transmission side of the Patent Document 2 converts a multicast packet into a unicast packet by encapsulation in accordance with a reception request from the packet conversion device on a reception side. Concretely, a client notifies the packet conversion device on a reception side of a desired multicast address, and the packet conversion device on a reception side transmits a reception request of a tree ID corresponding to this multicast address to the packet conversion device on a transmission side. Upon reception of this, the packet conversion device on a transmission side performs the encapsulation with using the request source of this reception request as a destination. Note that, when the packet conversion device on a reception side performs a reception request to the packet conversion device on a transmission side, the packet conversion device on a reception side acquires a correspondence relation among the multicast address, the IP address of the packet conversion device on a transmission side and the tree ID through an address management server, and performs the reception request based on this correspondence relation.

SUMMARY OF THE INVENTION

The multicast communication has been widely used for various purposes directed to multimedia contents such as video distribution and a virtual network such as VXLAN (Virtual eXtensible Local Area Network). For example, when it is desired to perform the multicast communication between the distant areas, usually, the carrier network of a telecommunications provider is used. In the carrier network, for example, routing of the multicast packet is performed by using a multicast routing protocol typified by PIM (Protocol Independent Multicast).

However, in the case where a router which does not support the PIM is present in the carrier network or a router in which the PIM does not normally operate for some reason is present in the carrier network, there may occur a case in which the multicast packet is unnecessarily routed over a wide range. Consequently, there is a threat that the network congestion typified by the loop of packet occurs in the carrier network. For the prevention of such a case, the relay of the multicast packet is prohibited in some carrier networks.

In order to achieve the multicast communication even when the carrier network like this is present, for example, the use of the techniques described in the Patent Document 1 and the Patent Document 2 is taken into account. However, in the techniques of the Patent Document 1 and the Patent Document 2, processes required as the preparation for performing the multicast communication are complicated, and there is a possibility that the processing load is increased. Concretely, for example, in both of the techniques described in the Patent Document 1 and the Patent Document 2, prior to the actual multicast communication, it is necessary to perform a communication from a packet conversion device on a reception side to a packet conversion device on a transmission side. A variety of information needs to be acquired during this communication in the technique of the Patent Document 1, and a variety of information needs to be acquired for performing this communication in the technique of the Patent Document 2.

The present invention has been made in view of the problem mentioned above, and one object of the present invention is to provide a relay system and a switching device capable of achieving the multicast communication with a simple mechanism.

The above and other objects and novel characteristics of the present invention will be apparent from the description of the present specification and the accompanying drawings.

The following is a brief description of an outline of the typical embodiment of the invention disclosed in the present application.

A relay system according to the present embodiment includes: a plurality of switching devices to which different representative IP addresses are set; a layer 3 network connecting the plurality of switching devices; and a control plane connected to the plurality of switching device. Each of the plurality of switching devices includes: a snooping unit; a snooping table; a snooping table synchronization unit; a transmission packet conversion unit; and a reception packet conversion unit. When a request packet representing a join request to a multicast group or a leave request from a multicast group is relayed to a predetermined router, the snooping unit acquires a correspondence relation between a port which has received the request packet and a multicast group contained in the request packet. The snooping table retains or deletes the correspondence relation between the port and the multicast group acquired by the snooping unit in accordance with the join request or the leave request. The snooping table synchronization unit acquires a correspondence relation between a multicast group and the representative IP addresses set to other switching devices other than its own switching device retained in the snooping tables of the other switching devices through the control plane and registers the acquired correspondence relation to its own snooping table. When a multicast packet whose destination is a multicast group is received at a predetermined port, the transmission packet conversion unit extracts the one or plural representative IP addresses corresponding to the multicast group based on the snooping table. Then, the transmission packet conversion unit converts the multicast packet into a unicast packet whose destination is the extracted representative IP address. When a unicast packet whose destination is the representative IP address set to its own switching device is received at a predetermined port, the reception packet conversion unit converts the unicast packet into a multicast packet.

The effects obtained by typical embodiments of the invention disclosed in the present application will be briefly described below. That is, it is possible to achieve the multicast communication with a simple mechanism in a relay system and a switching device.

BRIEF DESCRIPTIONS OF THE DRAWINGS

FIG. 14 is a diagram showing an example of the contents of snooping tables retained in the L2SWs (switching devices) in the relay system of FIG. 13.

DESCRIPTIONS OF THE PREFERRED EMBODIMENTS

Figure 1:
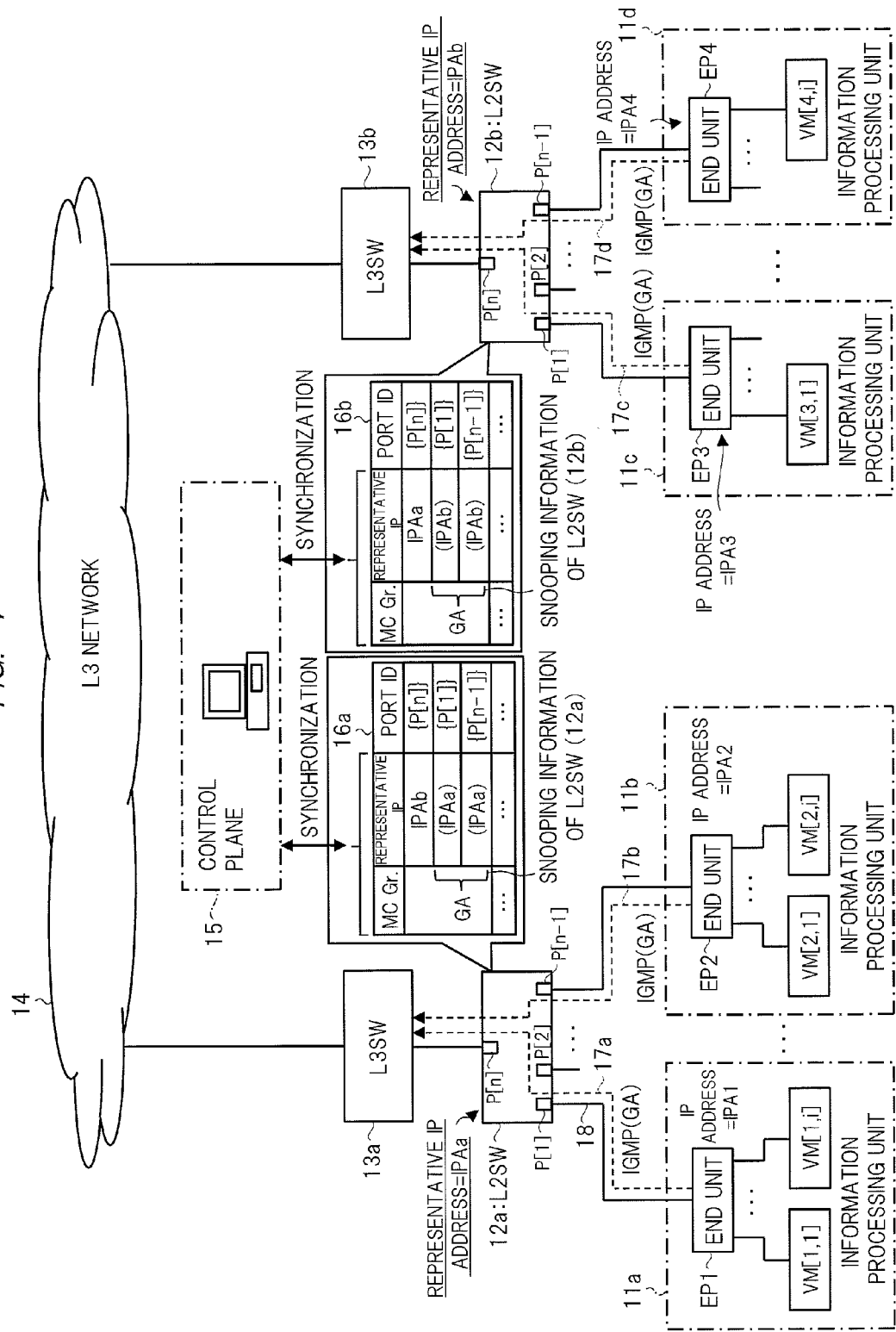
FIG. 1 is a block diagram showing a schematic configuration example and a schematic operation example of a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or apart of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

Schematic Configuration of Relay System

FIG. 1 is a block diagram showing a schematic configuration example and a schematic operation example of a relay system according to the first embodiment of the present invention. Though not particularly limited, the relay system shown in FIG. 1 is, for example, a relay system of a datacenter to which VXLAN (Virtual eXtensible Local Area Network) is applied. The relay system has a plurality of information processing units including information processing units 11a to 11d, layer 2 switching devices (hereinafter, abbreviated as L2SW) 12a and 12b, layer 3 switching devices (hereinafter, abbreviated as L3SW) 13a and 13b, a layer 3 network (hereinafter, abbreviated as L3 network) 14 and a control plane 15.

Each of the L2SWs 12a and 12b is a switching device to be a main part of this embodiment and has a plurality of ports P[1] to P[n]. The port P[n] of the L2SW 12a is connected to the L3 network 14 through the L3SW 13a, and the port P[n] of the L2SW 12b is connected to the L3 network 14 through the L3SW 13b. More specifically, the L3 network 14 connects the plurality of switching devices (L2SW 12a and L2SW 12b). The control plane 15 is connected to the plurality of switching devices (L2SW 12a and L2SW 12b).

The ports P[1] to P[n-1] of the L2SWs 12a and 12b are connected to the information processing units through communication lines 18. In this example, the ports P[1] and P[n-1] of the L2SW 12a are connected to the information processing units 11a and 11b, respectively, and the ports P[1] and P[n-1] of the L2SW 12b are connected to the information processing units 11c and 11d, respectively. For example, each of the information processing units 11a to 11d is a server device or the like in the same datacenter, and though not particularly limited, the information processing units 11a and 11b are placed in a site A and the information processing units 11c and 11d are placed in a site B distant from the site A.

Hereinafter, the L2SWs 12a and 12b are collectively referred to as a L2SW 12 and the information processing units 11a to 11d are collectively referred to as an information processing unit 11.

The information processing unit 11a includes a tunnel end unit EP1 and a plurality of (i) virtual terminals VM[1,1] to VM[i,i] subordinate to the tunnel end unit EP1. Also, the information processing unit 11b includes a tunnel end unit EP2 and a plurality of (i) virtual terminals VM[2,1] to VM[2,i] subordinate to the tunnel end unit EP2. Similarly, the information processing unit 11c includes a tunnel end unit EP3 and a plurality of virtual terminals (only VM[3,1] is shown as a representative) and the information processing unit 11d includes a tunnel end unit EP4 and a plurality of virtual terminals (only VM[4,i] is shown as a representative).

The information processing unit 11 is made up of, for example, a rack-type server device, and the tunnel end unit EP can be implemented on a software basis or by a ToR (Top of Rack) physical switch. Hereinafter, the virtual terminals VM[1,1] to VM[1,i], VM[2,1] to VM[2,i], VM[3,1] and VM[4,i] are collectively referred to as a virtual terminal VM, and the tunnel end units EP1 to EP4 are collectively referred to as a tunnel end unit EP.

<<Schematic Operation of Relay System (Premise)>>

Figure 2:
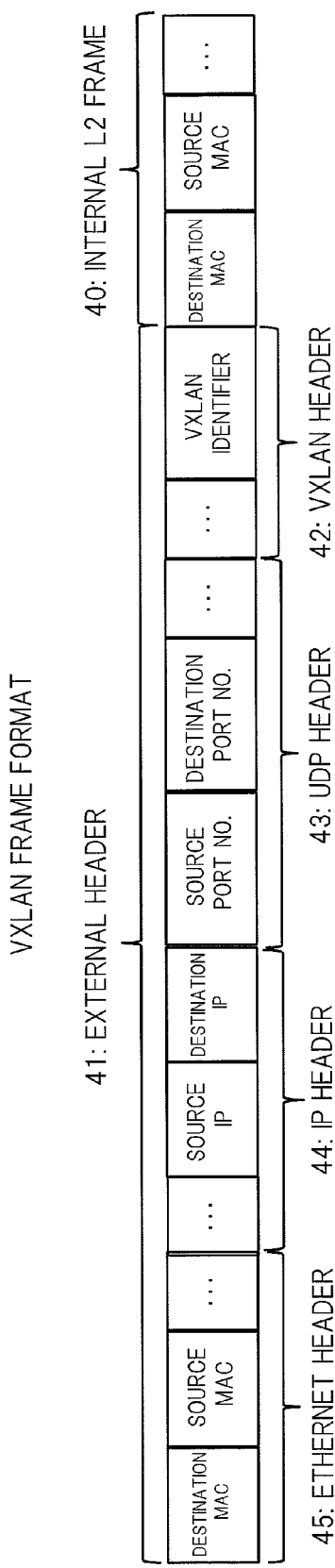
FIG. 2 is a schematic diagram showing an example of a VXLAN frame format.

Next, the operation example to be the premise in the relay system of FIG. 1 will be described on the assumption that the IP (Internet Protocol) addresses of the tunnel end units EP1 to EP4 are IPA1 to IPA4, respectively. First, VXLAN will be briefly described. FIG. 2 is a schematic diagram showing an example of a VXLAN frame format. VXLAN is a tunneling protocol capable of establishing the logical L2 network on the L3 network 14 by encapsulating an internal L2 frame 40 with an external header 41. Concretely, each virtual terminal VM is configured to be subordinate to the tunnel end unit EP called VTEP (Virtual Tunnel End Point), and the communication between the virtual terminals VM subordinate to different VTEPs is carried out through the communication between corresponding VTEPs.

For example, the case where the tunnel end unit EP1 (VTEP) receives the internal L2 frame 40 whose destination is the MAC (Media Access Control) address of the virtual terminal VM[4,i] from the subordinate virtual terminal VM[1,1] is assumed. When the tunnel end unit EP1 has already learned the correspondence relation between the MAC address of the virtual terminal VM[4,i] and the IP address IPA4 of the tunnel end unit EP4, the tunnel end unit EP1 encapsulates the received internal L2 frame 40 with the external header 41 and then transmits it to the tunnel end unit EP4 serving as the destination.

Concretely, the external header 41 includes a VXLAN header 42 containing a VXLAN identifier, a UDP (User Datagram Protocol) header 43, an IP header 44 and an Ethernet (registered trademark) header 45. The tunnel end unit EP1 stores its own IP address IPA1 in a source IP address of the IP header 44 and stores the IP address IPA4 of the tunnel end unit EP4 in a destination IP address of the IP header 44, and then transmits the unicast packet to the tunnel end unit EP4.

In this specification, as a matter of convenience, "packet" and "frame" are treated as synonyms unless otherwise stated. For example, the unicast packet transmitted from the tunnel end unit EP1 to the tunnel end unit EP4 as described above is transmitted in a frame format including the Ethernet header 45 in practice as shown in FIG. 2, but "packet" and "frame" at this time are not particularly distinguished in description from each other.

On the other hand, when the tunnel end unit EP1 has not learned the correspondence relation between the MAC address of the virtual terminal VM[4,i] and the IP address IPA4 of the tunnel end unit EP4, the tunnel end unit EP1 performs the flooding by using the IP multicast. Concretely, in the VXLAN, a VXLAN identifier is assigned to each virtual terminal VM, and a broadcast domain is set by the VXLAN identifier and a multicast group is associated for each VXLAN identifier. Consequently, the VTEP can perform the above-described flooding by the multicast communication in the same multicast group.

For example, the case where the virtual terminal VM having the same VXLAN identifier (that is, belonging to the same multicast group GA) as the virtual terminal VM[1,1] in the information processing unit 11a of FIG. 1 is present in the information processing units 11b to 11d of FIG. 1 is assumed. In this case, among the tunnel end units EP1 to EP4, a delivery path of the multicast group GA is established in advance by using a multicast protocol such as IGMP (Internet Group Management Protocol) and a multicast routing protocol such as PIM.

In this state, when the tunnel end unit EP1 has not learned the correspondence relation between the MAC address of the virtual terminal VM[4,i] and the IP address IPA4 of the tunnel end unit EP4 as described above, the tunnel end unit EP1 stores the IP address corresponding to the multicast group GA in the destination IP address of the IP header 44 and then transmits it. This multicast packet is transferred to the tunnel end units EP2 to EP4 through the delivery path of the multicast group GA established in advance.

The tunnel end unit EP4 removes the external header 41 from the multicast packet and transmits the internal L2 frame 40 to the virtual terminal VM[4,1]. Also, the tunnel end units EP2 to EP4 learn the correspondence relation between the MAC address of the virtual terminal VM[1,1] and the IP address IPA1 of the tunnel end unit EP1 based on the information of the source contained in the multicast packet.

<<Problem in Schematic Operation of Relay System (Premise)>>

As described above, when the delivery path of the multicast group GA is to be established, for example, a routing path of the multicast packet is established between the L3SW 13a and the L3SW 13b of FIG. 1 through the L3 network 14 based on PIM or the like. However, the L3 network 14 is, for example, a carrier network of a telecommunications provider and the passage of the multicast packet is prohibited in some cases.

In this case, in the relay system to which the VXLAN is applied, the flooding by the information processing unit 11 described above cannot be performed. Although the case of using the VXLAN is taken as an example here, of course, the problem occurs also when the multicast communication is performed in the relay system for multimedia contents. For example, also when a multicast packet is to be delivered from a server to clients assuming that the information processing unit 11a is the server and the information processing units 11c and 11d are the clients, the delivery of the multicast packet cannot be performed.

<<Schematic Operation of Relay System (Present Embodiment)>>

Hence, in the relay system of FIG. 1, individual representative IP addresses are set to the plurality of switching devices (L2SWs 12a and 12b) in advance, and the plurality of switching devices synchronize the correspondence relation between each of the representative IP addresses and a multicast group subordinate to each representative IP address acquired by snooping of IGMP or the like through the control plane 15. Then, the L2SWs 12a and 12b convert the received multicast packet into the unicast packet whose destination is the representative IP address and transmit it to a predetermined port based on the synchronized information. Also, when the L2SWs 12a and 12b receive the unicast packet whose destination is the representative IP address, the L2SWs 12a and 12b convert the unicast packet into the multicast packet and transmit it to a port based on the snooping.

Concretely, in the example of FIG. 1, the representative IP address IPAa is set in advance to the L2SW 12a and the representative IP address IPAb is set in advance to the L2SW 12b. When the L2SW 12a relays IGMP packets 17a and 17b from the tunnel end units EP1 and EP2 to the L3SW 13a, the L2SW 12a acquires the correspondence relation between the port which has received the IGMP packet and the multicast group contained in the IGMP packet. Then, the L2SW 12a retains the acquired correspondence relation in a snooping table 16a or deletes it from the snooping table 16a based on the type of the IGMP packet.

As the IGMP packet (in other words, request packet), a packet called IGMP report (or IGMP join) which represents the join request to a multicast group and a packet called IGMP leave which represents the leave request from a multicast group are mainly present. When the L2SW 12a relays the IGMP report, the L2SW 12a retains the above-described correspondence relation in the snooping table 16a, and when the L2SW 12a relays the IGMP leave, the L2SW 12a deletes the above-described correspondence relation from the snooping table 16a.

In the example of FIG. 1, it is presupposed that the IGMP packets 17a and 17b are IGMP reports representing the join request to the multicast group GA. In this case, the L2SW 12a retains the correspondence relation between the port P[1] (here, identifier {P[1]} thereof) which has received the IGMP packet 17a and the multicast group GA contained in the IGMP packet 17a in the snooping table 16a. Also, the L2SW 12a retains the correspondence relation between the port P[n−1] (here, identifier {P[n−1]} thereof) which has received the IGMP packet 17b and the multicast group GA contained in the IGMP packet 17b in the snooping table 16a.

Similarly, when the L2SW 12b relays the IGMP packets 17c and 17d from the tunnel end units EP3 and EP4 to the L3SW 13b, the L2SW 12b acquires the correspondence relation between the port which has received the IGMP packet and the multicast group contained in the IGMP packet. Here, it is presupposed that the IGMP packets 17c and 17d are IGMP reports representing the join request to the multicast group GA.

In this case, the L2SW 12b retains the correspondence relation between the port P[1] (here, identifier {P[1]} thereof) which has received the IGMP packet 17c and the multicast group GA contained in the IGMP packet 17c in the snooping table 16b. Similarly, the L2SW 12b retains the correspondence relation between the port P[n−1] (here, identifier {P[n−1]} thereof) which has received the IGMP packet 17d and the multicast group GA contained in the IGMP packet 17d in the snooping table 16b.

The function described above is known as a so-called IGMP snooping. Though the IGMP is taken as an example here, MLD (Multicast Listener Discovery) used for IPv6 may be used instead of the IGMP.

Furthermore, the switching device (for example, L2SW 12a) acquires the correspondence relation between the multicast group GA and the representative IP address (here, IPAb) set to the other switching device (L2SW 12b) retained in the snooping table 16b of the other switching device (L2SW 12b) through the control plane 15. Then, the switching device (for example, L2SW 12a) registers the acquired correspondence relation to its own snooping table 16a. As a result, the snooping table 16a retains the correspondence relation between the multicast group GA and the representative IP address IPAb as shown in FIG. 1.

Though not particularly limited, the correspondence relation acquired through the control plane 15 is registered in association with the port P[n] (here, identifier {P[n]} thereof). The port P[n] is a router (here, L3SW 13a) port preset for the L2SW 12a or a router port automatically detected by the L2SW 12a.

Similarly, the switching device (for example, L2SW 12b) also acquires the correspondence relation between the multicast group GA and the representative IP address (here, IPAa) set to the other switching device (L2SW 12a) retained in the snooping table 16a of the other switching device (L2SW 12a) through the control plane 15. Then, the switching device (for example, L2SW 12b) registers the acquired correspondence relation to its own snooping table 16b. As a result, the snooping table 16b retains the correspondence relation between the multicast group GA and the representative IP address IPAa as shown in FIG. 1. Here, like the case of the snooping table 16a, the correspondence relation is registered in association with the port P[n] (here, identifier {P[n]} thereof).

Also, in the example of FIG. 1, the L2SWs 12a and 12b retain the information acquired by the above-described their own snooping processes in their own snooping tables 16a and 16b in association with their own representative IP addresses. For example, the L2SW 12a retains the correspondence relation between the ports P[1] and P[n−1] and the multicast group GA acquired by the snooping process in the snooping table 16a in association with its own representative IP address IPAa.

In this case, as described above, when the L2SW 12b acquires the information of the snooping table 16a of the L2SW 12a through the control plane 15, it is enough if the L2SW 12b acquires the correspondence relation between the multicast group GA and the representative IP address IPAa retained in the snooping table 16a. However, since the L2SWs 12a and 12b recognize their own representative IP addresses, it is not always necessary to retain their own representative IP addresses in their own snooping tables 16a and 16b. More specifically, when the L2SW 12b acquires the information of the multicast group GA contained in the snooping table 16a of the L2SW 12a, it is enough if the L2SW 12a adds its own representative IP address IPAa to the information.

Figure 3:
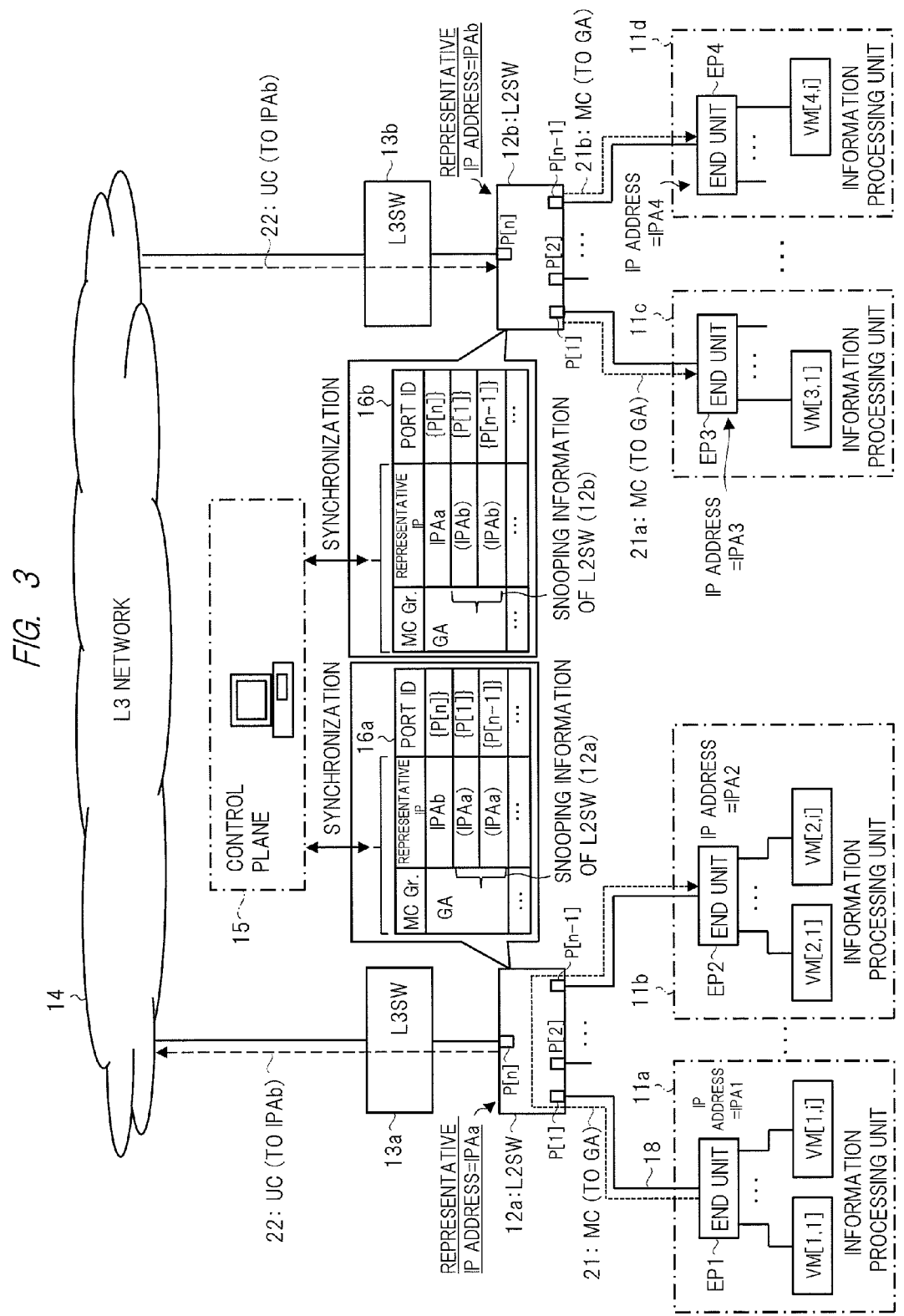
FIG. 3 is a block diagram showing the schematic operation example continued from FIG. 1.

FIG. 3 is a block diagram showing the schematic operation example continued from FIG. 1. Here, like the case of FIG. 1, the case where the tunnel end unit EP1 receives the internal L2 frame 40 whose destination is the virtual terminal VM[4,*i*] from the virtual terminal VM[1,1] and the tunnel end unit EP1 performs the flooding due to that the destination has not been learned is assumed. In this case, the tunnel end unit EP1 transmits a multicast (MC) packet 21, which contains the IP address corresponding to the multicast group GA in the destination IP address of the external header 41, to the L2SW 12a.

When the L2SW 12a receives the multicast packet 21 whose destination is the multicast group GA at a predetermined port (here, P[1]) in this manner, the L2SW 12a performs the port extraction process based on the snooping table 16a. Concretely, the L2SW 12a extracts the port corresponding to the multicast group GA from the ports acquired by its own snooping process (in other words, associated with its own representative IP address) based on the snooping table 16a. In this manner, the L2SW 12a extracts the port P[n−1]. Note that the port P[1] is excluded from the extraction objects because it is the port which has received the multicast packet 21. The L2SW 12a relays the multicast packet 21 to the extracted port P[n−1].

Furthermore, when the L2SW 12a receives the multicast packet 21 whose destination is the multicast group GA at a predetermined port (here, P[1]), the L2SW 12a extracts one or plural representative IP addresses set to other L2SWs 12 other than the L2SW 12a itself and corresponding to the multicast group GA based on the snooping table 16a. In the example of FIG. 3, the L2SW 12a extracts the representative IP address IPAb.

Subsequently, the L2SW 12a converts the multicast packet 21 received at the predetermined port into the unicast packet whose destination is the representative IP address extracted based on the snooping table 16a. In this example, the L2SW 12a converts the multicast packet 21 into the unicast packet 22 whose destination (destination IP address) is the representative IP address IPAb.

Figure 4:
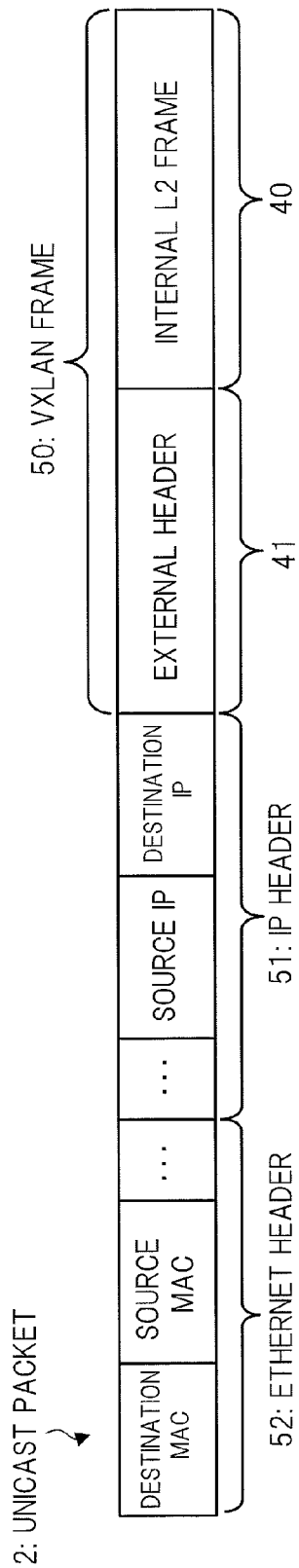
FIG. 4 is a schematic diagram showing an example of a unicast packet (frame) format generated by a conversion process of a L2SW (switching device) of FIG. 3.

FIG. 4 is a schematic diagram showing an example of a unicast packet (frame) format generated by the conversion process of the L2SW (switching device) of FIG. 3. As shown in FIG. 4, concretely, the L2SW 12a converts the multicast packet 21 (VXLAN frame 50) having the format shown in FIG. 2 into the unicast packet 22 by encapsulating it with an IP header 51 whose source is its own representative IP address IPAa and whose destination is the extracted representative IP address IPAb. At this time, though not particularly limited, the L2SW 12a sets its own MAC address to the source MAC address contained in the Ethernet header 52 of the unicast packet (frame) 22 and sets the MAC address of the L3SW 13a to the destination MAC address.

Subsequently, the L2SW 12a transmits the unicast packet 22 whose destination is the representative IP address IPAb to the port P[n] corresponding thereto based on the snooping table 16a. The unicast packet 22 transmitted from the port P[n] is transferred to the L2SW 12b through the L3SW 13a, the L3 network 14 and the L3SW 13b.

When the L2SW 12b receives the unicast packet whose destination is the representative IP address set to the L2SW 12b itself at a predetermined port, the L2SW 12b converts the unicast packet into the multicast packet. Therefore, when the L2SW 12b receives the unicast packet 22 at the port P[n], since the destination IP address contained in the unicast packet 22 is the representative IP address IPAb set to the L2SW 12b itself, the L2SW 12b converts the unicast packet 22 into the multicast packet. Concretely, the L2SW 12b converts (in other words, restores) the unicast packet into the multicast packet by removing the IP header 51 and the Ethernet header 52 shown in FIG. 4 (that is, decapsulating).

The L2SW 12b recognizes the multicast group GA from the information stored in the destination IP address (corresponding to the destination IP address in the IP header 44 of FIG. 2) of the multicast packet generated by the above-described conversion process. The L2SW 12b extracts the port corresponding to the multicast group GA from the ports acquired by its own snooping process (in other words, associated with its own representative IP address IPAb) based on the snooping table 16b. Consequently, the L2SW 12b extracts the ports P[1] and P[n−1] and transmits the converted multicast packets 21a and 21b to the ports P[1] and P[n−1].

The tunnel end units EP2 and EP3 receive the multicast packets 21 and 21a, respectively, and remove the external header 41 for encapsulation of FIG. 2, thereby restoring the internal L2 frame 40. Since the destination MAC address (here, MAC address of the virtual terminal VM[4,i]) contained in the internal L2 frame 40 is not present in the subordinate virtual terminals VM of the tunnel end units EP2 and EP3, the tunnel end units EP2 and EP3 perform the flooding. Concretely, the tunnel end units EP2 and EP3 perform the flooding of the internal L2 frame 40 to the subordinate virtual terminals VM having the same VXLAN identifier as the VXLAN identifier contained in the multicast packets 21 and 21a.

On the other hand, the tunnel end unit EP4 receives the multicast packet 21b and removes the external header 41 for encapsulation, thereby restoring the internal L2 frame 40. Since the destination MAC address (here, MAC address of the virtual terminal VM[4,i]) contained in the internal L2 frame 40 is present in the subordinate virtual terminals VM of the tunnel end unit EP4, the tunnel end unit EP4 transmits the internal L2 frame 40 to the virtual terminal VM[4,i].

As described above, by using the relay system and the switching device shown in FIG. 1 and FIG. 3, even when the L3 network 14 prohibits the passage of the multicast packet, the equivalent multicast communication can be achieved by converting the multicast packet into the unicast packet. In addition, even when the L3SW 13a and the L3SW 13b do not support the PIM or others, the multicast communication can be achieved. In this case, since the multicast packet is converted into the uncast packet by the mechanism which utilizes and synchronizes the snooping information of the L2SWs (switching devices) 12a and 12b, the multicast communication can be achieved by a simple mechanism.

More specifically, unlike the Patent Document 1 and the Patent Document 2, it is not necessary to perform the complicated communication from the packet conversion device on a reception side (that is, gateway or router) to the packet conversion device on a transmission side as the preparation prior to the multicast communication, and it is enough if the snooping tables 16a and 16b are simply synchronized through the control plane 15. In this manner, since it is possible to achieve the multicast communication with a simple mechanism, the processing load can be reduced.

<<Configuration of Switching Device>>

Figure 5:
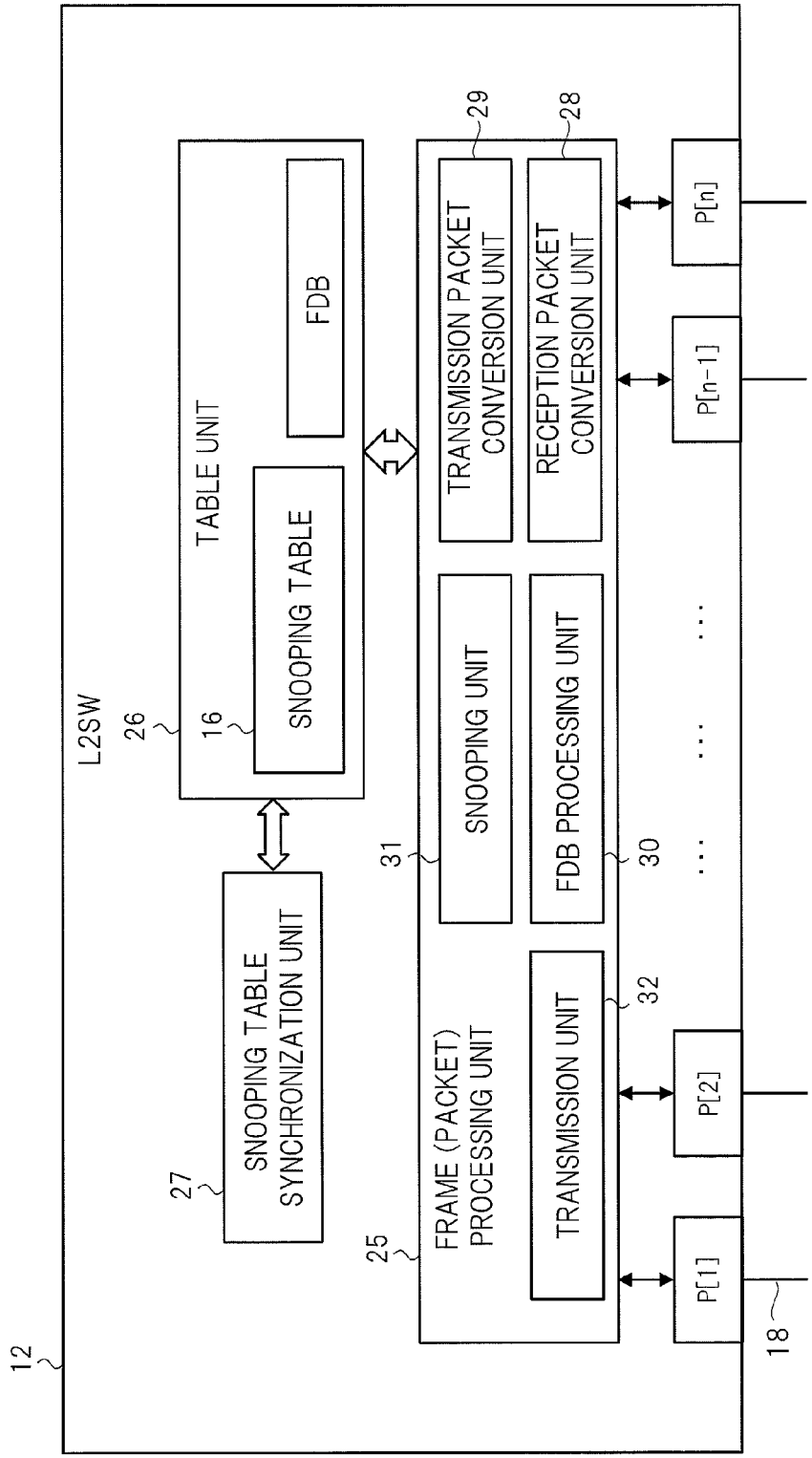
FIG. 5 is a block diagram showing a schematic configuration example of a main part of the L2SW (switching device) in the relay system of FIG. 1.

FIG. 5 is a block diagram showing a schematic configuration example of a main part of the L2SW (switching device) in the relay system of FIG. 1. The L2SW (switching device) 12 shown in FIG. 4 includes a plurality of (here, n) ports P[1] to P[n], a frame (packet) processing unit 25, a table unit 26 and a snooping table synchronization unit 27. The table unit 26 has an address table FDB and the snooping table 16. As is widely known, the address table FDB retains the correspondence relation between the plurality of ports P[1] to P[n] and the MAC addresses present ahead of the plurality of ports. The snooping table 16 corresponds to the snooping tables 16a and 16b shown in FIG. 1 and FIG. 3.

The frame (packet) processing unit 25 includes a reception packet conversion unit 28, a transmission packet conversion unit 29, a FDB processing unit 30, a snooping unit 31 and a transmission unit 32. As is widely known, the FDB processing unit 30 performs the learning of the source and the retrieval of the destination using the address table FDB. Concretely, when the FDB processing unit 30 receives the frame at the plurality of ports P[1] to P[n], the FDB processing unit 30 learns the correspondence relation between the source MAC address contained in the frame and the port which has received the frame in the address table FDB. Also, the FDB processing unit 30 retrieves the address table FDB with using the destination MAC address contained in the frame as a retrieval key, thereby determining the destination port.

The reception packet conversion unit 28, the transmission packet conversion unit 29, the snooping unit 31 and the snooping table synchronization unit 27 perform the process described with reference to FIG. 1 and FIG. 3. More specifically, the snooping unit 31 performs the snooping process when relaying the request packet representing the join request to a multicast group or the leave request from a multicast group (for example, IGMP report or IGMP leave) to a predetermined router. Concretely, the snooping unit 31 acquires a correspondence relation between the port which has received the request packet and the multicast group contained in the request packet.

The snooping table 16 retains or deletes the correspondence relation between the port and the multicast group acquired by the snooping unit 31 in accordance with the join request or the leave request. At this time, though not particularly limited, the snooping table 16 retains the correspondence relation in association with its own representative IP address as described with reference to FIG. 1. The snooping table synchronization unit 27 acquires the correspondence relation between the multicast group and the representative IP address set to each of the other L2SWs 12 other than its own L2SW 12 retained in the snooping table 16 of each of the other L2SWs 12 through the control plane 15, and registers the acquired correspondence relation to its own snooping table 16.

When the transmission packet conversion unit 29 receives the multicast packet whose destination is the multicast group, the transmission packet conversion unit 29 extracts the one or plural representative IP addresses set to other switching devices and corresponding to the multicast group based on the snooping table 16. Then, the transmission packet conversion unit 29 converts the multicast packet into the unicast packet whose destination is the extracted representative IP address. Concretely, the transmission packet conversion unit 29 converts the multicast packet into the unicast packet by encapsulation as described with reference to FIG. 3.

When the reception packet conversion unit 28 receives the unicast packet whose destination is the representative IP address set to its own L2SW, the reception packet conversion unit 28 converts the unicast packet into the multicast packet. Concretely, the reception packet conversion unit 28 converts the unicast packet into the multicast packet by decapsulation as described with reference to FIG. 3.

Also, the snooping unit 31 performs the extraction process of the port corresponding to the received multicast packet in addition to the above-described snooping process of the request packet. Concretely, when the snooping unit 31 receives the unicast packet whose destination is the multicast group, the snooping unit 31 recognizes the multicast group. Then, the snooping unit 31 extracts the port corresponding to the multicast group from the ports acquired by its own snooping process involved in the relay of the request packet (in other words, associated with its own representative IP address) based on the snooping table 16.

Here, there are two cases where the snooping unit 31 receives the multicast packet. The first is the case where the multicast packet is received at the predetermined port (port P[1] in FIG. 3) like the case of the L2SW 12a of FIG. 3. The second is the case where the multicast packet is received from the reception packet conversion unit 28 like the case of the L2SW 12b of FIG. 3.

The transmission unit 32 relays the frame received at the plurality of ports P[1] to P[n] to the destination port determined by the FDB processing unit 30. Also, as described above, the transmission unit 32 relays (or transmits) the multicast packet to the port extracted by the snooping unit 31 in the two cases. Furthermore, the transmission unit 32 transmits the unicast packet generated by the conversion in the transmission packet conversion unit 29 to the predetermined port (that is, router port P[n]) based on the snooping table 16.

<<Detailed Operation of Relay System and Switching Device>>

Figure 6:
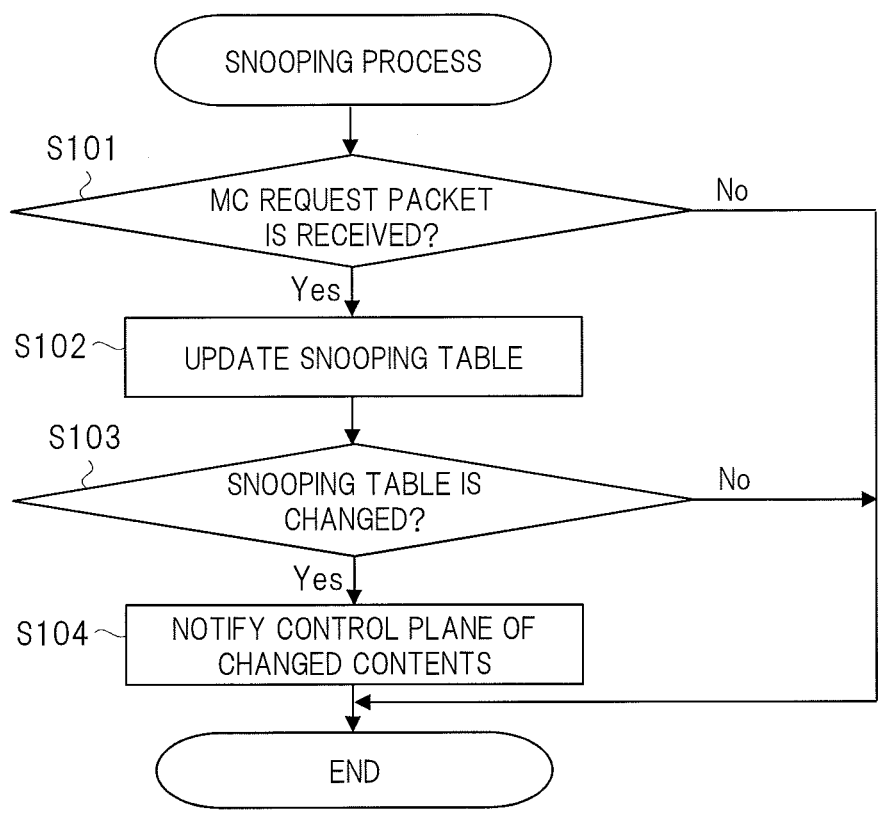
FIG. 6 is a flowchart showing an example of process contents of a snooping process performed by the L2SW (switching device) in the relay system of FIG. 1.

FIG. 6 is a flowchart showing an example of process contents of the snooping process performed by the L2SW (switching device) in the relay system of FIG. 1. In FIG. 6, the L2SW (switching device) 12 (specifically, snooping unit 31) determines whether the multicast (MC) request packet (for example, IGMP report or IGMP leave) is received (step S101). When the request packet is not received, the L2SW 12 finishes the process.

On the other hand, when the request packet is received, the L2SW (snooping unit 31) updates the snooping table 16 (step S102). Concretely, the L2SW 12 (snooping unit 31) performs the registration when the request packet is the join request and performs the deletion when the request packet is the leave request as described above. Subsequently, the L2SW 12 (specifically, snooping table synchronization unit 27) determines whether the snooping table 16 is changed (step S103). When changed, the L2SW 12 (snooping table synchronization unit 27) notifies the control plane 15 of the changed contents (step S104) and when not changed, the L2SW 12 finishes the snooping process.

Figure 7:
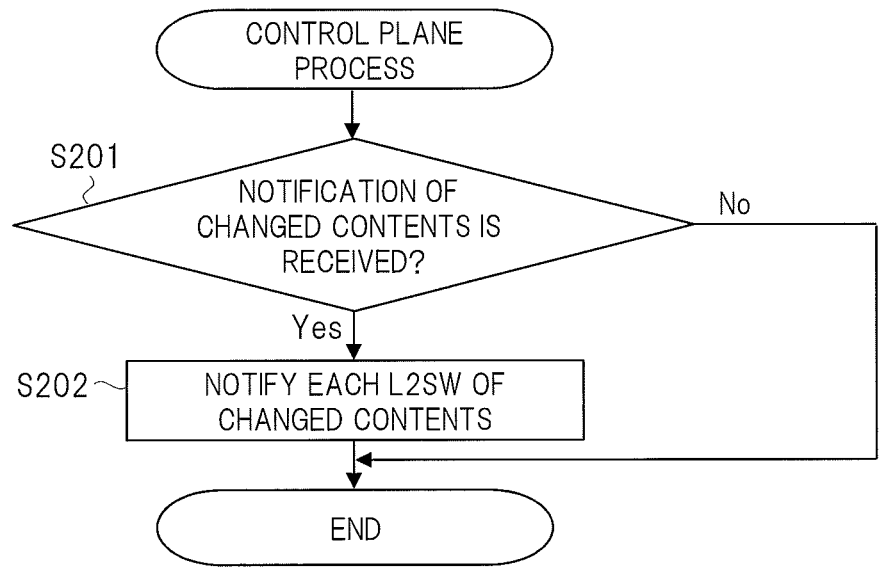
FIG. 7 is a flowchart showing an example of process contents performed by a control plane in the relay system of FIG. 1.

FIG. 7 is a flowchart showing an example of process contents performed by the control plane in the relay system of FIG. 1. In FIG. 7, the control plane 15 determines whether the notification of the changed contents in the step S104 of FIG. 6 is received (step S201). When the notification of the changed contents is not received, the control plane 15 finishes the process. On the other hand, when the notification of the changed contents is received, the control plane 15 notifies each of the L2SWs 12 other than the source of the changed contents of the received changed contents (step S202).

Figure 8:
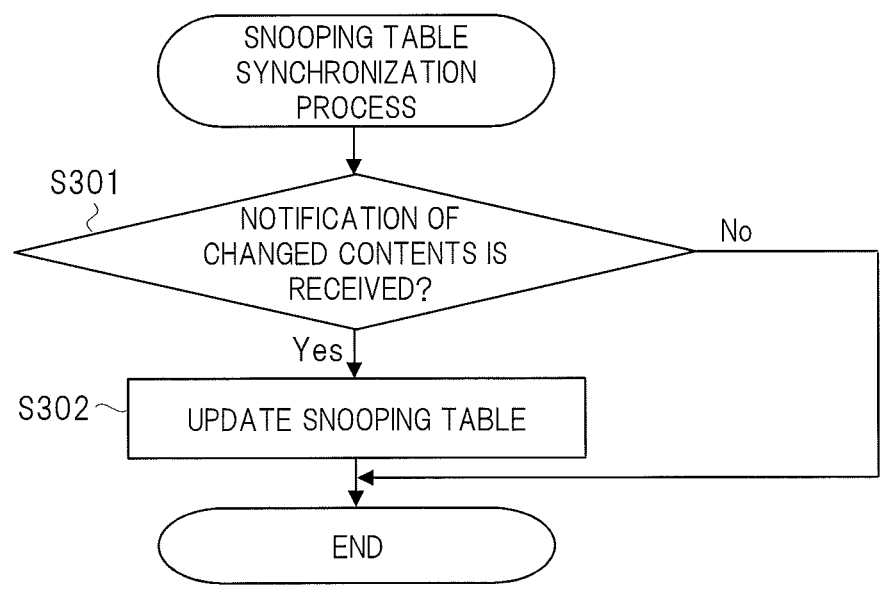
FIG. 8 is a flowchart showing an example of process contents of a snooping table synchronization process performed by the L2SW (switching device) in the relay system of FIG. 1.

FIG. 8 is a flowchart showing an example of process contents of the snooping table synchronization process performed by the L2SW (switching device) in the relay system of FIG. 1. In FIG. 8, the L2SW 12 (specifically, snooping table synchronization unit 27) determines whether the notification of the changed contents in the step S202 of FIG. 7 is received (step S301). When the notification of the changed contents is not received, the L2SW 12 (snooping table synchronization unit 27) finishes the process. On the other hand, when the notification of the changed contents is received, the L2SW 12 (snooping table synchronization unit 27) updates the snooping table 16 based on the received changed contents (step S302).

As described above, when the snooping table 16 of a L2SW 12 is changed by its own snooping unit 31, the snooping table synchronization unit 27 of the L2SW 12 notifies the snooping table synchronization unit 27 of each of the other L2SWs 12 of the changed contents through the control plane 15. In this manner, the snooping tables 16 of the L2SWs 12 can be synchronized with a small communication volume.

However, the synchronization method is not always limited to the method described above, and other synchronization methods may be used. For example, the method in which the snooping table synchronization units 27 of the L2SWs 12 are synchronized at regular intervals with reference to the control plane 15 is possible. Alternatively, this regular synchronization method and the synchronization method using the occurrence of change as a trigger described with reference to FIG. 6 to FIG. 8 may be combined.

Figure 9:
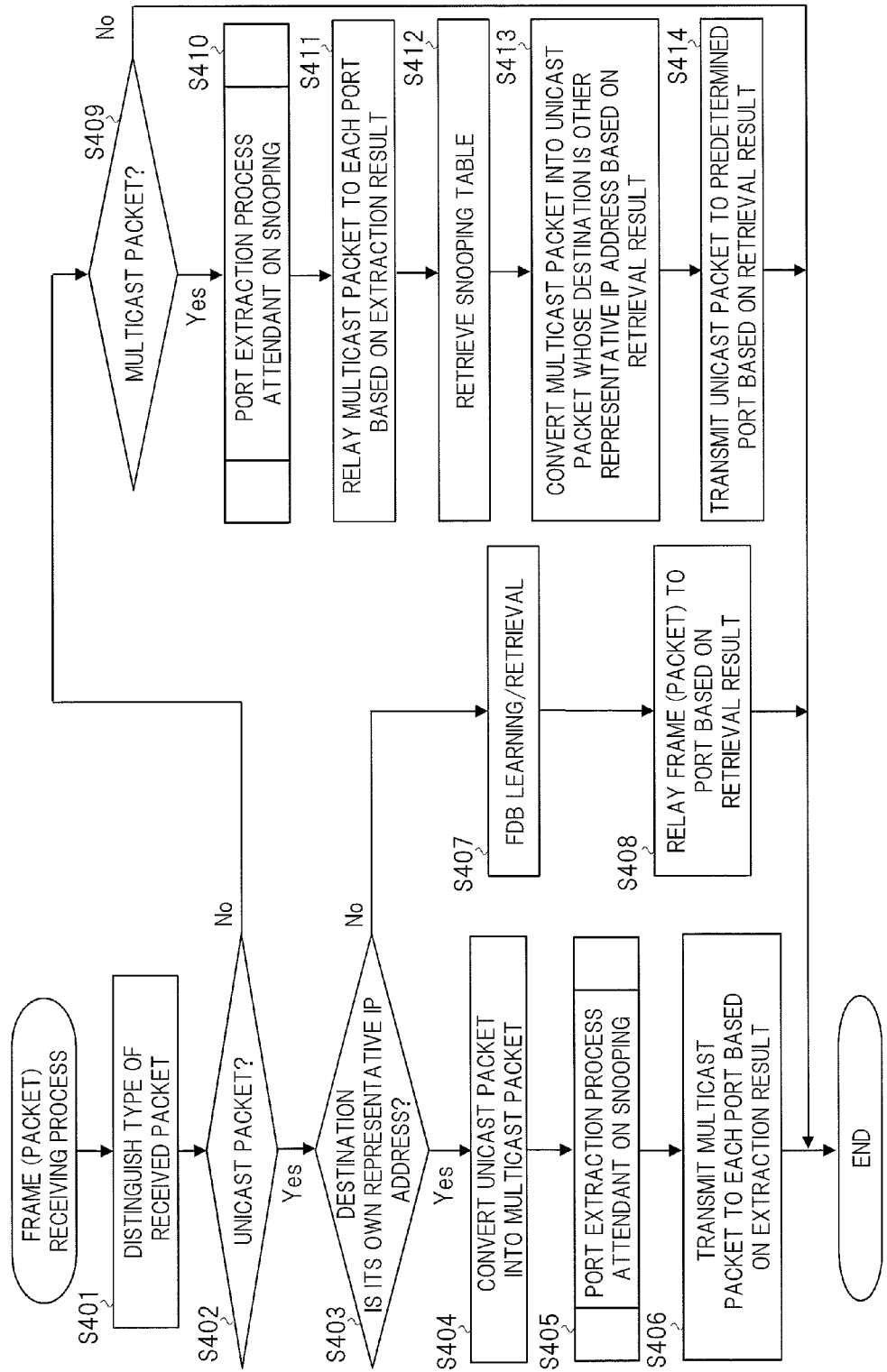
FIG. 9 is a flowchart showing an example of process contents of a frame (packet) receiving process performed by the L2SW (switching device) in the relay system of FIG. 1.
Figure 10:
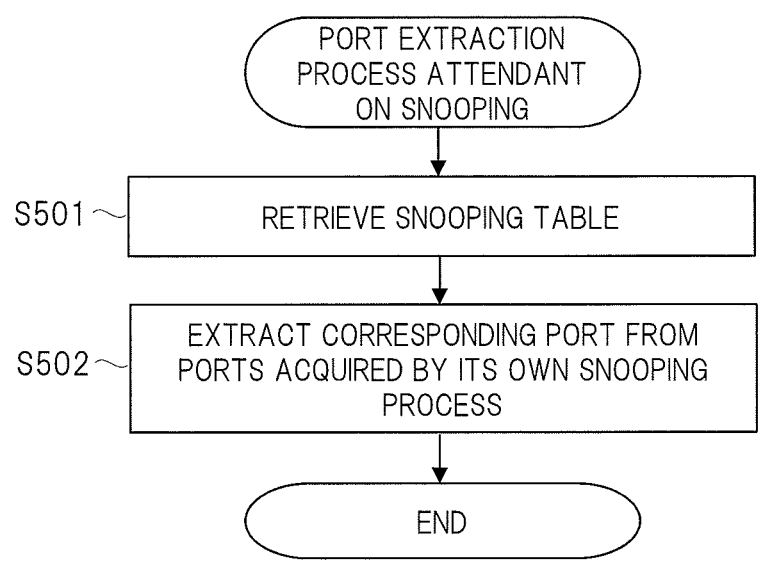
FIG. 10 is a flowchart showing an example of process contents of a port extraction process attendant on the snooping in FIG. 9.

FIG. 9 is a flowchart showing an example of process contents of a frame (packet) receiving process performed by the L2SW (switching device) in the relay system of FIG. 1. FIG. 10 is a flowchart showing an example of process contents of a port extraction process attendant on the snooping in FIG. 9. As shown in FIG. 9, the L2SW 12 (specifically, frame (packet) processing unit 25) first distinguishes the type of the received packet (step S401). As a result, when the received packet is a unicast packet, the L2SW (frame (packet) processing unit 25) moves to the step S403, and when the received packet is a multicast packet, the L2SW moves to the step S410 (steps S402 and S409).

Concretely, the L2SW (frame (packet) processing unit 25) makes the distinction in the step S401 depending on whether the destination IP address in the IP header 44 or the destination MAC address in the Ethernet header 45 is the unicast address or the multicast address. In practice, as described with reference to FIG. 6, the determination as to whether the received packet is the MC request packet is also performed together in the step S401.

In the step S403, the L2SW 12 (specifically, reception packet conversion unit 28) determines whether the destination of the received unicast packet is its own representative IP address (step S403). When the destination of the received unicast packet is its own representative IP address, the L2SW 12 (reception packet conversion unit 28) converts the unicast packet into the multicast packet (step S404). Concretely, the L2SW 12 (reception packet conversion unit 28) decapsulates the unicast packet.

Subsequently, the L2SW 12 (specifically, snooping unit 31) performs the port extraction process attendant on the snooping as shown in FIG. 10 (step S405). In FIG. 10, the L2SW 12 (snooping unit 31) retrieves the snooping table 16 (step S501). Then, the L2SW 12 (snooping unit 31) extracts the port corresponding to the multicast group of the multicast packet generated by the conversion in the step S404 from the ports acquired by its own snooping process (FIG. 6) based on the snooping table 16 (step S502). At this time, the ports acquired by its own snooping process (FIG. 6) are the ports associated with its own representative IP address in the example of the snooping table 16 in FIG. 1 and FIG. 3.

Subsequent to this step S405, the L2SW 12 (specifically, transmission unit 32) transmits the multicast packet to each port extracted in the step S405 (step S406).

On the other hand, when the destination of the received unicast packet is not its own representative IP address in the step S403, the L2SW 12 (specifically, FDB processing unit 30) learns and retrieves the address table FDB (step S407). More specifically, the L2SW 12 (FDB processing unit 30) learns the source MAC address contained in the Ethernet header 45 of the received unicast packet (frame) in the address table FDB. Also, the L2SW 12 (FDB processing unit 30) retrieves the address table FDB with using the destination MAC address contained in the Ethernet header 45 of the received unicast packet (frame) as a retrieval key. Subsequently, in the step S408, the L2SW 12 (specifically, transmission unit 32) relays the received unicast packet to the port based on the retrieval result in the step S407.

In the step S410, the L2SW 12 (specifically, snooping unit 31) performs the port extraction process attendant on the snooping shown in FIG. 10. More specifically, the L2SW 12 (snooping unit 31) extracts the port corresponding to the multicast group of the received multicast packet based on the snooping table 16. Subsequently, the L2SW 12 (specifically, transmission unit 32) relays the multicast packet to each port extracted in the step S410 (step S411).

Next, the L2SW 12 (specifically, transmission packet conversion unit 29) retrieves the snooping table 16 and extracts one or plural representative IP addresses corresponding to the multicast group of the received multicast packet from the representative IP addresses set to the other switching devices (step S412). Subsequently, the L2SW 12 (transmission packet conversion unit 29) converts the multicast packet to the unicast packet whose destination is the representative IP address extracted in the step S412 (step S413).

Then, the L2SW 12 (specifically, transmission unit 32) transmits each unicast packet generated by the conversion in the step S413 to the predetermined port (step S414). The predetermined port is the router port P[n] and is retained in association with each representative IP address in the example of the snooping table 16 in FIG. 1 and FIG. 3.

As described above, by using the relay system and the switching device of the first embodiment, typically, the multicast communication can be achieved by the simple mechanism.

Second Embodiment

Schematic Configuration of Relay System (Control Plane)

Figure 11:
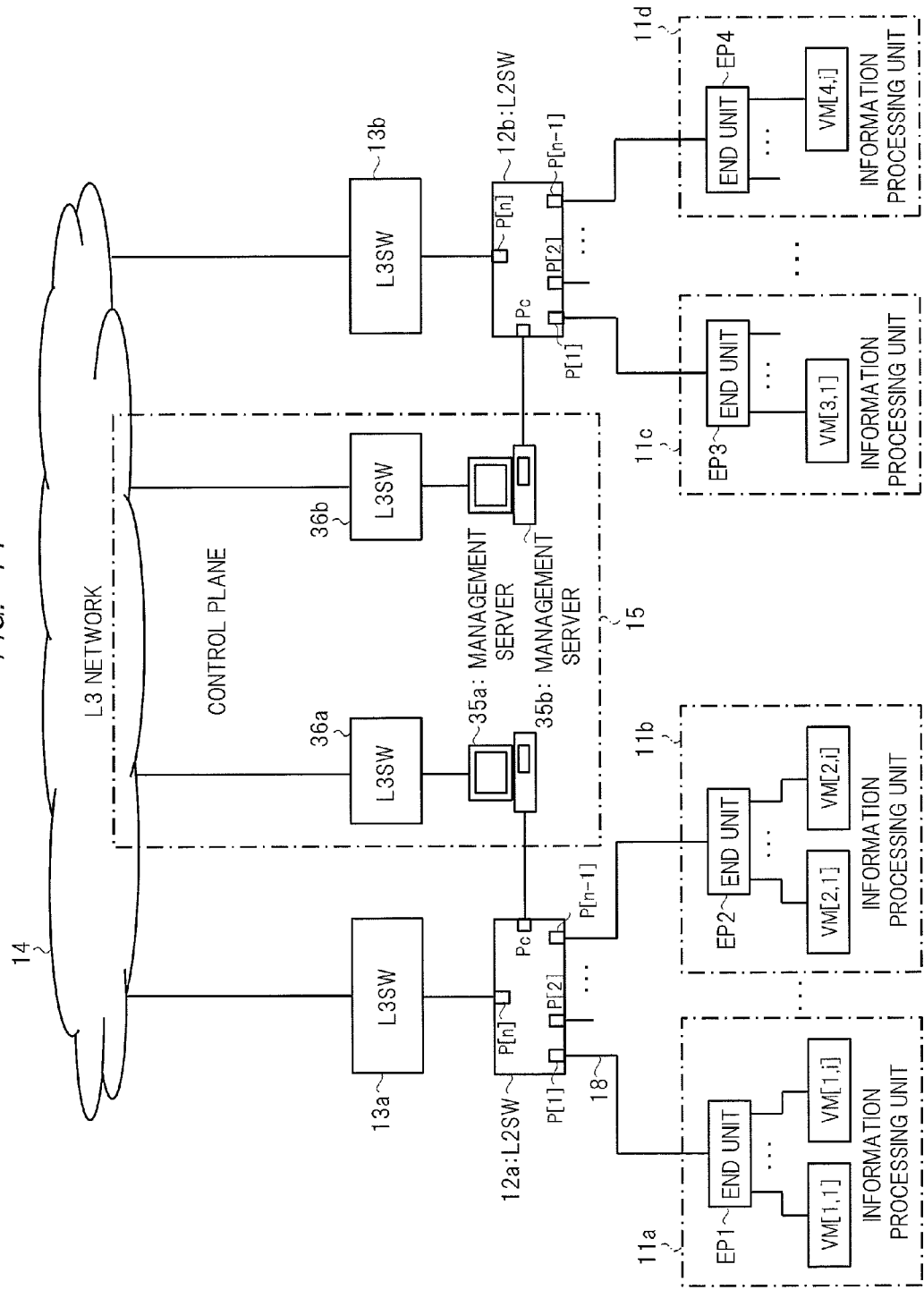
FIG. 11 is a block diagram showing a schematic configuration example of a relay system according to the second embodiment of the present invention.
Figure 12:
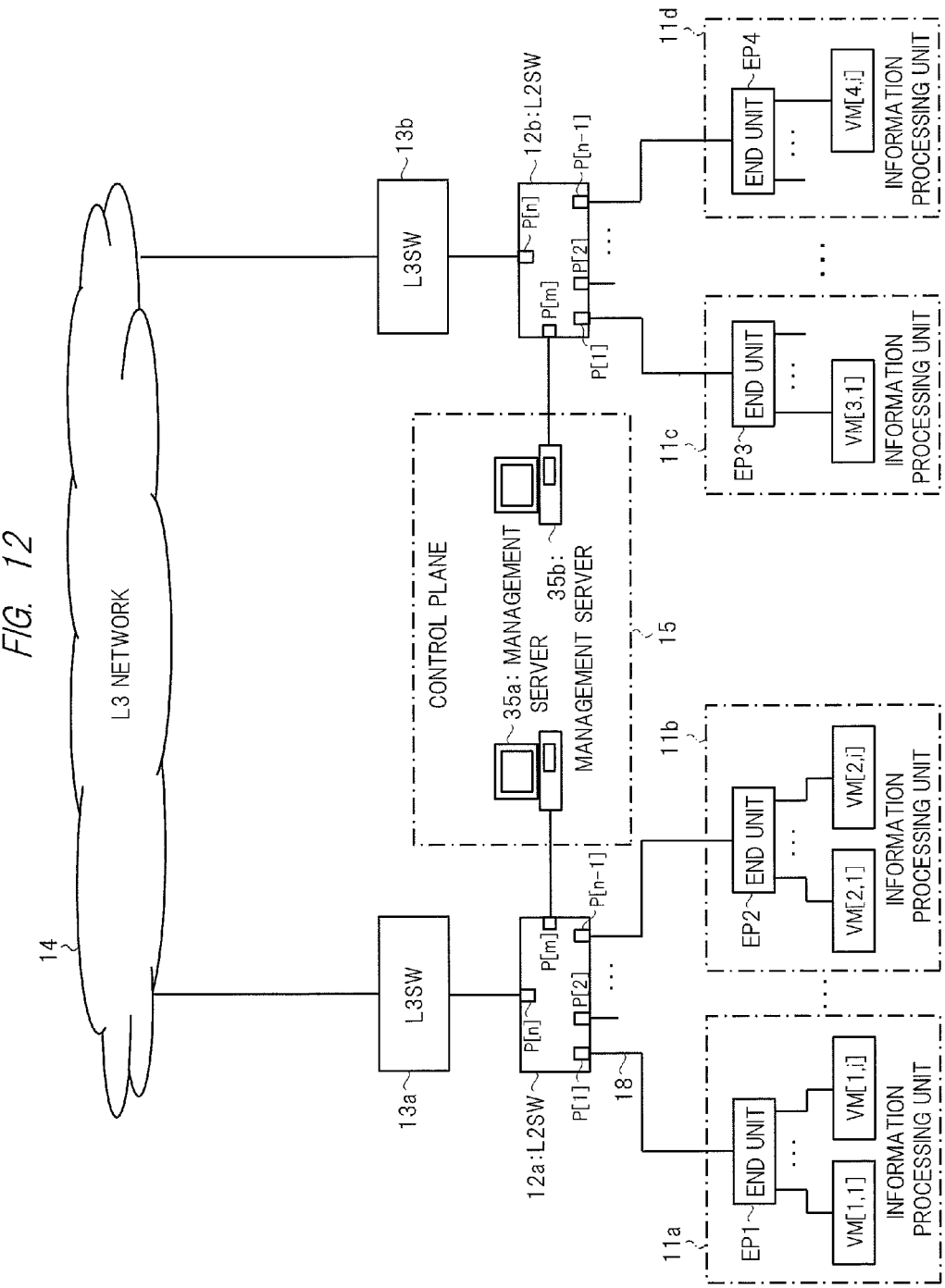
FIG. 12 is a block diagram showing a schematic configuration example different from that of FIG. 11.

In the second embodiment, the configuration example of the control plane 15 described in the first embodiment will be described in detail. FIG. 11 is a block diagram showing a schematic configuration example in a relay system according to the second embodiment of the present invention. FIG. 12 is a block diagram showing a schematic configuration example different from that of FIG. 11. The relay system shown in FIG. 11 and FIG. 12 has the same configuration as that of the relay system in FIG. 1, and the configuration of the control plane 15 is shown in detail in FIG. 11 and FIG. 12. The control plane 15 will be described below, but since the parts other than that are the same as those of the first embodiment, the detailed description thereof will be omitted.

The control plane 15 shown in FIG. 11 includes a plurality of management servers 35a and 35b and a management network which connects the plurality of management servers 35a and 35b. The management servers 35a and 35b are connected to dedicated management ports Pc provided in the L2SWs 12a and 12b, respectively. Here, the management network is made up of L3SWs 36a and 36b connected to the management servers 35a and 35b, respectively and a dedicated management network connecting the L3SW 36a and the L3SW 36b. The dedicated network is not particularly limited, and it is configured by using, for example, the L3 network 14.

On the other hand, in the configuration of the control plane 15 shown in FIG. 12, unlike the case of FIG. 11, the management servers 35a and 35b are connected to the normal ports (Ethernet ports) P[m] of the L2SWs 12a and 12b, respectively. Also, the management network connecting the plurality of management servers 35a and 35b is established in the manner of sharing the normal data transfer path between the L2SW 12a and the L2SW 12b through the L3 network 14.

In FIG. 11 and FIG. 12, for example, in the case where the information processing units 11a and 11b are placed in a site A and the information processing units 11c and 11d are placed in a site B distant from the site A, the management server is placed in each of the sites in many cases. The management servers 35a and 35b can be established by using the management servers in each site like these. In this case, since the control plane 15 can be implemented without separately adding the devices and others, the cost reduction can be achieved. For example, by implementing the software which performs the process described with reference to FIG. 7 on the existing management server, the communication between the snooping table synchronization units 27 described in the first embodiment can be controlled.

Also, in FIG. 12, unlike the case of FIG. 11, the management servers 35a and 35b control the communication between the snooping table synchronization units 27 described in the first embodiment by the so-called in-band management through the L3 network 14. By performing the in-band management, the dedicated network becomes unnecessary unlike the case of FIG. 11, so that further benefits in terms of cost can be obtained in some cases. Note that, when the in-band management is performed, the control plane 15 can be implemented by one management server depending on conditions.

Third Embodiment

Schematic Operation of Relay System (Modified Example)

Figure 13:
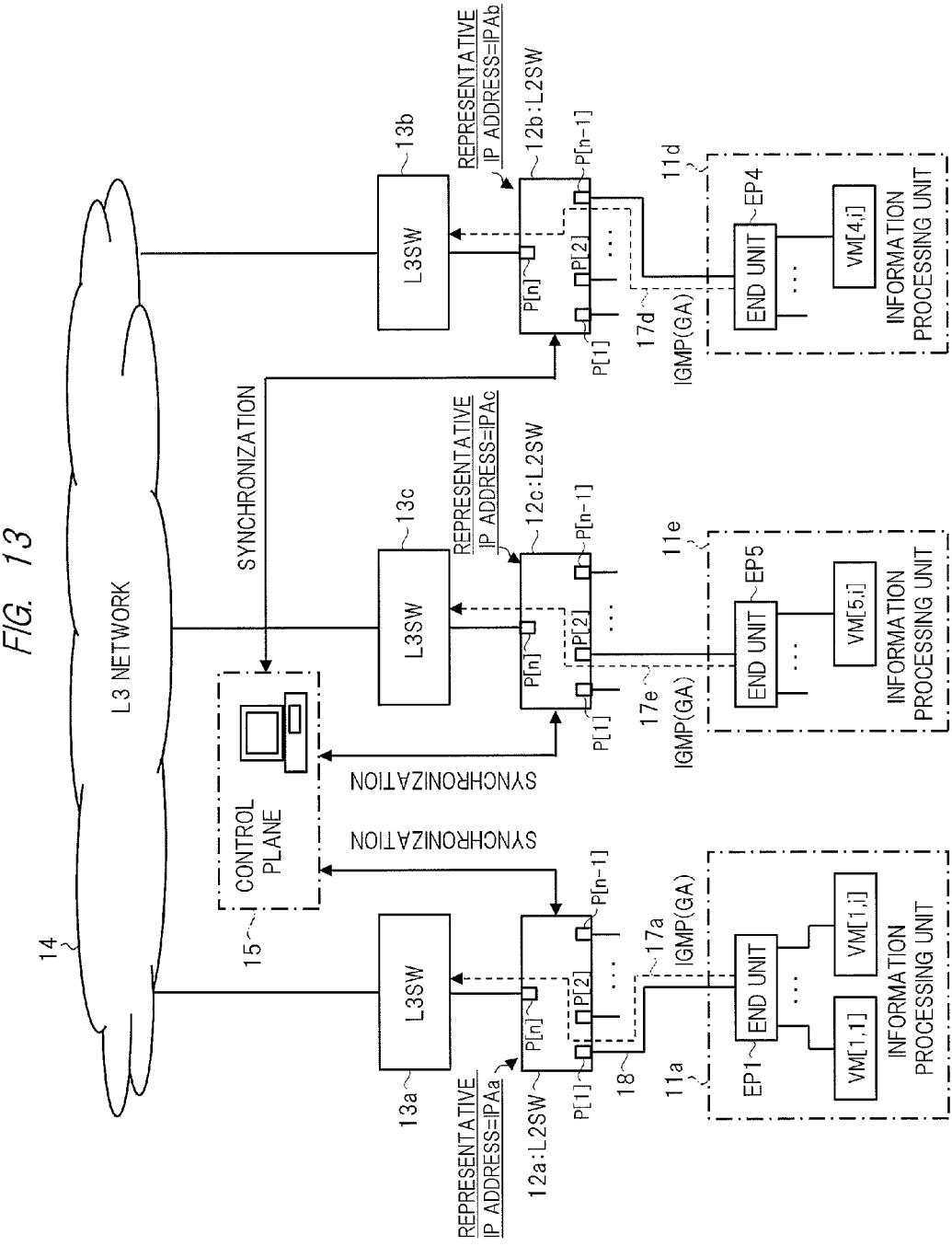
FIG. 13 is a block diagram showing a schematic configuration example and a schematic operation example of a relay system according to the third embodiment of the present invention.

In the first embodiment described above, for example, the case where the two sites A and B are connected to the L3 network 14 is assumed as an example of a network of a datacenter or the like, but in the third embodiment, the case where three or more sites are connected is assumed. FIG. 13 is a block diagram showing a schematic configuration example and a schematic operation example of a relay system according to the third embodiment of the present invention. In the configuration of the relay system shown in FIG. 13, an information processing unit 11e, a L2SW 12c and a L3SW 13c are added to the relay system shown in FIG. 1. As to the information processing units 11 connected to the L2SWs 12a and 12b of FIG. 13, the information processing units 11a and 11b in FIG. 1 are illustrated as representatives for the convenience of description.

The information processing unit 11e includes a tunnel end unit EP5 and a virtual terminal VM[5,i]. The tunnel end unit EP5 is connected to a port P[2] of the L2SW 12c. A port (router port) P[n] of the L2SW 12c is connected to the L3 network 14 through the L3SW 13c. A representative IP address IPAc is set in advance to the L2SW 12c. Also, the L2SW 12c is also connected to the control plane 15 in addition to the L2SWs 12a and 12b. For example, the information processing unit 11e is placed in a site C distance from the site A in which the information processing unit 11a is placed and the site B in which the information processing unit 11d is placed.

In this configuration, in the example of FIG. 13, the tunnel end unit EP1 of the information processing unit 11a transmits an IGMP packet (IGMP report) 17a, which is a join request to the multicast group GA, to the L2SW 12a. Similarly, the tunnel end units EP4 and EP5 of the information processing units 11d and 11e transmit IGMP packets (IGMP reports) 17d and 17e, which are join requests to the multicast group GA, to the L2SWs 12b and 12c, respectively.

Each of the L2SWs 12a to 12c performs the snooping process in the same manner as that of the first embodiment and further synchronizes the snooping tables through the control plane 15. As a result, the L2SWs 12a to 12c retain the snooping tables 16a to 16c shown in FIG. 14, respectively. FIG. 14 is a diagram showing an example of the contents of snooping tables retained in the L2SWs (switching devices) in the relay system of FIG. 13.

The correspondence relation between the multicast group GA and the port identifier {P[1]} acquired by the snooping unit 31 of the L2SW 12a is retained in the snooping table 16a of the L2SW 12a. Though not particularly limited, this correspondence relation is retained in association with the representative IP address IPAa of the L2SW 12a like the case of FIG. 1. Similarly, in the snooping table 16b of the L2SW 12b, the correspondence relation between the multicast group GA and the port identifier {P[n−1]} acquired by the snooping unit 31 of the L2SW 12b is retained in association with the representative IP address IPAb of the L2SW 12b. In the snooping table 16c of the L2SW 12c, the correspondence relation between the multicast group GA and the port identifier {P[2]} acquired by the snooping unit 31 of the L2SW 12c is retained in association with the representative IP address IPAc of the L2SW 12c.

Also, in the snooping table 16a of the L2SW 12a, the correspondence relation between the multicast group GA and the representative IP address IPAb acquired from the snooping table 16b of the L2SW 12b through the control plane 15 is retained. Furthermore, in the snooping table 16a, the correspondence relation between the multicast group GA and the representative IP address IPAc acquired from the snooping table 16c of the L2SW 12c through the control plane 15 is retained. Though not particularly limited, these correspondence relations are retained in association with the port identifier {P[n]} of the router port P[n] like the case of FIG. 1.

Similarly, in the snooping table 16b of the L2SW 12b, the correspondence relations between the multicast group GA and the representative IP addresses IPAa and IPAc acquired from the snooping tables 16a and 16c of the other L2SWs 12a and 12c through the control plane 15 are retained in association with the port identifier {P[n]}. In the snooping table 16c of the L2SW 12c, the correspondence relations between the multicast group GA and the representative IP addresses IPAa and IPAb acquired from the snooping tables 16a and 16b of the other L2SWs 12a and 12b through the control plane 15 are retained in association with the port identifier {P[n]}.

Figure 15:
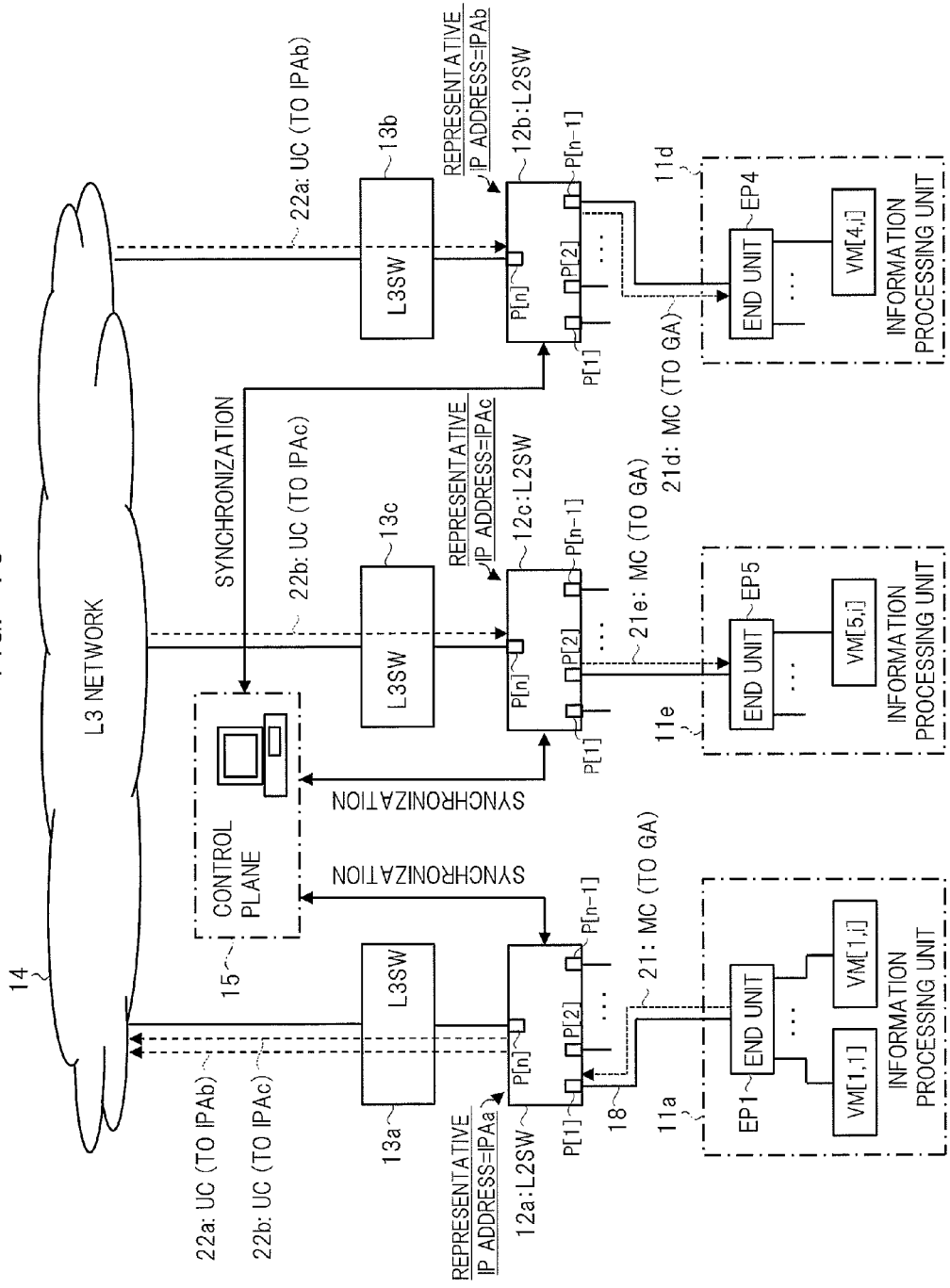
FIG. 15 is a block diagram showing the schematic operation example continued from FIG. 13.

FIG. 15 is a block diagram showing the schematic operation example continued from FIG. 13. Here, like the case of FIG. 3, the case where the tunnel end unit EP1 receives the internal L2 frame 40 whose destination is the virtual terminal VM[4,i] from the virtual terminal VM[1,1] and the tunnel end unit EP1 performs the flooding due to that the destination has not been learned is assumed. In this case, the tunnel end unit EP1 transmits a multicast (MC) packet 21, which contains the IP address corresponding to the multicast group GA in the destination IP address of the external header 41, to the L2SW 12a.

When the L2SW 12a receives the multicast packet 21 whose destination is the multicast group GA, the L2SW 12a extracts one or plural representative IP addresses which are set to other L2SWs 12 other than the L2SW 12a itself and correspond to the multicast group GA based on the snooping table 16a. In the example of FIG. 14, the L2SW 12a extracts the representative IP addresses IPAb and IPAc.

Subsequently, the L2SW 12a converts the received multicast packet 21 into the unicast packet whose destination is the representative IP address extracted based on the snooping table 16a. In this example, the L2SW 12a converts the multicast packet 21 into the unicast packet 22a whose destination (destination IP address) is the representative IP address IPAb and the unicast packet 22b whose destination (destination IP address) is the representative IP address IPAc. Concretely, the L2SW 12a converts the multicast packet into the unicast packet by encapsulation like the case of the first embodiment.

Next, the L2SW 12a transmits the unicast packets 22a and 22b to the respective corresponding ports P[n] based on the snooping table 16a. The unicast packet 22a is transferred to the L2SW 12b through the L3SW 13a, the L3 network 14 and the L3SW 13b. Also, the unicast packet 22b is transferred to the L2SW 12c through the L3SW 13a, the L3 network 14 and the L3SW 13c.

Since the L2SWs 12b and 12c have received the unicast packets 22a and 22b whose destinations are the representative IP addresses IPAb and IPAc which are set to the L2SWs 12b and 12c themselves, the L2SWs 12b and 12c convert the unicast packets into the multicast packets 21d and 21e. Concretely, the L2SWs 12b and 12c convert the unicast packets into the multicast packets by decapsulation like the case of the first embodiment.

The L2SW 12b transmits the multicast packet 21d to the port (here, port P[n−1]) extracted based on the port extraction process attendant on the snooping described in the step S405 of FIG. 9 and FIG. 10. Similarly, the L2SW 12c transmits the multicast packet 21e to the port (here, port P[2]) extracted based on the port extraction process attendant on the snooping described above.

As described above, since the relay system and the switching device of the third embodiment can achieve the multicast communication with a simple mechanism as described in the first embodiment, it is possible to readily handle the increase in the number of sites. More specifically, it is possible to readily handle the increase in the number of sites by synchronizing the snooping tables 16 between the L2SWs 12 in each site through the control plane 15.

Note that the Patent Document 1 does not particularly assume the case where three or more sites are present like this. Also, the Patent Document 2 describes a method in which a branch point is provided in a relay device in the L3 network (WAN) and the state of the branch point is managed by the tree ID. In this case, however, the preparation prior to the multicast communication is more complicated as the number of sites increases, and there is threat that novel ideas are required as to where to set the branch point.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, in the above-described embodiments, the snooping information acquired by its own snooping unit 31 and the snooping information acquired from other switching devices through the control plane 15 are retained in one snooping table 16, but they may be separately retained in two snooping tables.

What is claimed is:

1. A relay system comprising:
a plurality of switching devices to which different representative IP addresses are set;
a layer 3 network connecting the plurality of switching devices; and
a control plane connected to the plurality of switching device,
wherein each of the plurality of switching devices includes:
a snooping unit which, when a request packet representing a join request to a multicast group or a leave request from a multicast group is relayed to a predetermined router, acquires a correspondence relation between a port which has received the request packet and a multicast group contained in the request packet;
a snooping table which retains or deletes the correspondence relation between the port and the multicast group acquired by the snooping unit in accordance with the join request or the leave request;
a snooping table synchronization unit which acquires a correspondence relation between a multicast group and the representative IP addresses set to other switching devices other than its own switching device retained in the snooping tables of the other switching devices through the control plane and registers the acquired correspondence relation to its own snooping table;
a transmission packet conversion unit which, when a multicast packet whose destination is a multicast group is received at a predetermined port, extracts the one or plural representative IP addresses corresponding to the multicast group based on the snooping table and converts the multicast packet into a unicast packet whose destination is the extracted representative IP address; and
a reception packet conversion unit which, when a unicast packet whose destination is the representative IP address set to its own switching device is received at a predetermined port, converts the unicast packet into a multicast packet.

2. The relay system according to claim 1,
wherein the transmission packet conversion unit converts the multicast packet into the unicast packet by encapsulating the multicast packet with an IP header whose source is the representative IP address of its own switching device and whose destination is the representative IP address extracted based on the snooping table, and
the reception packet conversion unit converts the unicast packet into the multicast packet by decapsulation.

3. The relay system according to claim 2,
wherein, when a multicast packet is received at the predetermined port and when a multicast packet is received from the reception packet conversion unit, the snooping unit extracts a port corresponding to a multicast group of the multicast packet based on the snooping table.

4. The relay system according to claim 3,
wherein, when the snooping table of each of the snooping table synchronization units of the plurality of switching devices is changed by its own snooping unit, the snooping table synchronization unit notifies the snooping table synchronization units of the other switching devices of changed contents through the control plane.

5. The relay system according to claim 1,
wherein the control plane includes:
a plurality of management servers which manage the plurality of switching devices; and
a management network connecting the plurality of management servers.

6. The relay system according to claim 5,
wherein the management network is included in the layer 3 network, and
the plurality of management servers control communication between the snooping table synchronization units of the plurality of switching devices by an in-band management through the layer 3 network.

7. A switching device to which a representative IP address is set, comprising:
a snooping unit which, when a request packet representing a join request to a multicast group or a leave request from a multicast group is relayed to a predetermined router, acquires a correspondence relation between a port which has received the request packet and a multicast group contained in the request packet;

a snooping table which retains or deletes the correspondence relation between the port and the multicast group acquired by the snooping unit in accordance with the join request or the leave request;

a snooping table synchronization unit which acquires a correspondence relation between a multicast group and the representative IP addresses set to other switching devices other than its own switching device retained in the snooping tables of the other switching devices through a control plane and registers the acquired correspondence relation to its own snooping table;

a transmission packet conversion unit which, when a multicast packet whose destination is a multicast group is received at a predetermined port, extracts the one or plural representative IP addresses corresponding to the multicast group based on the snooping table and converts the multicast packet into a unicast packet whose destination is the extracted representative IP address; and a reception packet conversion unit which, when a unicast packet whose destination is the representative IP address set to its own switching device is received at a predetermined port, converts the unicast packet into a multicast packet.

8. The switching device according to claim 7, wherein the transmission packet conversion unit converts the multicast packet into the unicast packet by encapsulating the multicast packet with an IP header whose source is the representative IP address of its own switching device and whose destination is the representative IP address extracted based on the snooping table, and the reception packet conversion unit converts the unicast packet into the multicast packet by decapsulation.

9. The switching device according to claim 8, wherein, when a multicast packet is received at the predetermined port and when a multicast packet is received from the reception packet conversion unit, the snooping unit extracts a port corresponding to a multicast group of the multicast packet based on the snooping table.

10. The switching device according to claim 9, wherein, when the snooping table of the snooping table synchronization unit is changed by its own snooping unit, the snooping table synchronization unit notifies the snooping table synchronization units of the other switching devices of changed contents through the control plane.

* * * * *